United States Patent
Borkowski et al.

(10) Patent No.: US 10,871,776 B2
(45) Date of Patent: Dec. 22, 2020

(54) METHOD FOR IDENTIFYING OBJECTS IN A TRAFFIC SPACE

(71) Applicant: Aptiv Technologies Limited, St. Michael (BB)

(72) Inventors: Dariusz Borkowski, Cracow (PL); Dominik Sasin, Cracow (PL); Pawel Markiewicz, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 153 days.

(21) Appl. No.: 16/354,589

(22) Filed: Mar. 15, 2019

(65) Prior Publication Data

US 2019/0302771 A1 Oct. 3, 2019

(30) Foreign Application Priority Data

Mar. 28, 2018 (EP) .................................. 18164540

(51) Int. Cl.
*G01S 7/41* (2006.01)
*G01S 7/48* (2006.01)
(Continued)

(52) U.S. Cl.
CPC .............. *G05D 1/021* (2013.01); *G01S 7/411* (2013.01); *G01S 7/4808* (2013.01); *G01S 13/89* (2013.01);
(Continued)

(58) Field of Classification Search
CPC .... G05D 1/021; G05D 1/0231; G05D 1/0257; G01S 17/931; G01S 17/42; G01S 7/411;
(Continued)

(56) References Cited

U.S. PATENT DOCUMENTS

| 6,085,151 A | 7/2000 | Farmer et al. |
| 2011/0282581 A1* | 11/2011 | Zeng ..................... G01S 7/4808 |
| | | 701/301 |

(Continued)

FOREIGN PATENT DOCUMENTS

| DE | 10 2014 111125 A1 | 2/2016 |
| DE | 10 2015 003666 A1 | 9/2016 |

*Primary Examiner* — Peter D Nolan
*Assistant Examiner* — Ashley L Redhead, Jr.
(74) *Attorney, Agent, or Firm* — Colby Nipper PLLC (57) ABSTRACT

A method for identifying objects in a traffic space by means of a sensor system arranged at or in a host vehicle comprises the steps of determining the positions of a plurality of object surface spots detected by the sensor system in a vehicle coordinate system, assigning the determined positions of object surface spots to at least one detection group by means of a clustering algorithm, wherein the clustering algorithm uses clustering regions defining threshold distances, and identifying at least one object by determining that positions of object surface spots belonging to the same detection group form part of a single object. The determined positions of object surface spots are transformed in a transformation process and the clustering algorithm is applied to the transformed positions of object surface spots. The transformation process includes a directional scaling step that renders the clustering regions non-circular in the vehicle coordinate system.

15 Claims, 7 Drawing Sheets

(51) Int. Cl.
*G01S 13/89* (2006.01)
*G01S 17/931* (2020.01)
*G05D 1/02* (2020.01)
*G01S 17/42* (2006.01)
*G01S 13/931* (2020.01)

(52) U.S. Cl.
CPC ............ *G01S 13/931* (2013.01); *G01S 17/42* (2013.01); *G01S 17/931* (2020.01); *G05D 1/0231* (2013.01); *G05D 1/0257* (2013.01); *G01S 2013/9323* (2020.01)

(58) Field of Classification Search
CPC ...... G01S 7/4808; G01S 13/931; G01S 13/89; G01S 2013/9323; G01S 7/415; G08G 1/167; G06K 9/6218
See application file for complete search history.

(56) References Cited

U.S. PATENT DOCUMENTS

2017/0097412 A1 4/2017 Liu et al.
2017/0248693 A1 8/2017 Kim

\* cited by examiner

METHOD FOR IDENTIFYING OBJECTS IN A TRAFFIC SPACE

TECHNICAL FIELD OF INVENTION

This disclosure generally relates to a method for identifying objects in a traffic space.

BACKGROUND OF INVENTION

Modern motor vehicles are often equipped with advanced driver assistance systems (ADAS), such as lane departure warning systems, lane change assistance systems, active brake assist systems and the like. Such systems generally require a reliable identification of objects such as guardrails, other vehicles or pedestrians present in the environment of the host vehicle. The sensor system arranged at or in the host vehicle may comprise a radar or a laser perception system. Such systems usually output a plurality of "single detections", i. e. positions of relatively small object surface spots which may be handled as object surface points. In order to distinguish separate objects on the basis of the single detections, groups of detections must be found. The shapes of the real objects may then be approximated—for example by creating a polyline on the ground plane on the basis of objects belonging to the same group.

Clustering algorithms are well known algorithms for finding groups in an amount of data. During clustering, it is checked if the distance of a certain point is below the threshold distance of an adjacent point. If so, the points are assigned to the same group. Based on grouped detections, an advanced driver assistance system knows which part of the traffic space is occupied and between which objects there is enough space to pass through. A proper clustering process is crucial for an acceptable performance of an advanced driver assistance system.

In practice, however, it is difficult to correctly identify the objects present in the traffic space. For example, during highway driving, the number of reflections from a guardrail may be rather low, especially at higher longitudinal distances from the host vehicle. The reasons for this problem are the smoothness of the guardrail, adverse angles of reflections and high sensing distances. Therefore, the detections related to a certain guardrail are often distributed in such way that the distances between them are higher than the radius of the clustering region. As a result, the approximated shape of the guardrail can be incomplete. In particular, the shape of the guardrail can contain gaps, or even be just a set of unconnected points on the ground plane. This is problematic in that the corresponding advanced driver assistance system may assume that there is a free space where in fact there is an obstacle. For example, the advanced driver assistance system may falsely indicate that it is possible to pass the guardrail in a gap between two unconnected detections. Moreover, if a real guardrail contains a relatively short gap, it may be preferable to close it, i.e. to see it as non-drivable space, because at a high speed, due to the dynamics of the host vehicle, it is not possible that the host vehicle can take a tight turn and drive through the gap.

To avoid this problem, it is possible to enlarge the clustering regions, for example by increasing a clustering radius. However, this action may result in closing gaps which are actually present, for example in closing the gap between the left and the right guardrail of a road. In this case, an artificial obstacle on the road is indicated, which is undesired and can even pose a potential danger.

SUMMARY OF THE INVENTION

The present invention relates to a method for identifying objects in a traffic space by means of a sensor system arranged at or in a host vehicle, comprising the steps: determining the positions of a plurality of object surface spots detected by the sensor system in a vehicle coordinate system, assigning the determined positions of object surface spots to at least one detection group by means of a clustering algorithm, wherein the clustering algorithm uses clustering regions defining threshold distances, and identifying at least one object by determining that positions of object surface spots belonging to the same detection group form part of a single object.

In accordance with the invention, the determined positions of object surface spots are transformed in a transformation process and the clustering algorithm is applied to the transformed positions of object surface spots, wherein the transformation process includes a directional scaling step that renders the clustering regions non-circular in the vehicle coordinate system.

Due to the directional scaling, the clustering algorithm allows broader gaps between detections in one direction than in another direction. Thus, the shape of the clustering regions may be adapted to a specific application. For example, a directional scaling step may be selected that renders the clustering regions longitudinal, wherein the longitudinal axis of the clustering region is oriented along the longitudinal axis of the host vehicle. In this case, single detections of a guardrail extending along the ego path of the host vehicle are reliably connected, wherein at the same time an undesired connection of the left guardrail and the right guardrail is avoided. Thus, there is no erroneous generation of artificial obstacles situated on the ego path.

Advantageous embodiments of the invention can be seen from the dependent claims, from the following description and the appended figures.

Preferably, the vehicle coordinate system is a two-dimensional coordinate system extending in a ground plane of the traffic space or parallel hereto and moving together with the host vehicle.

The clustering algorithm is preferably a hierarchical clustering algorithm. In particular, the clustering algorithm may be based on a nearest neighbor linking. Specifically, an S-link clustering algorithm can be used.

The clustering algorithm may define clustering regions surrounding the transformed positions and assign those transformed positions to a group which respectively are disposed within the clustering region of at least one adjacent position. In other words, the clustering algorithm may be carried out in a transformed space.

Particularly, the directional scaling step can render the clustering regions elliptical in the vehicle coordinate system, wherein longitudinal axes of the elliptical clustering regions respectively extend along a longitudinal axis of the host vehicle or along an assumed driving direction of the host vehicle. This enables a specifically strict grouping of detections which are located along the ego path of the host vehicle while avoiding a connection of detections situated on different sides of the ego path. Generally, the clustering regions as seen in the vehicle coordinate system are called "effective clustering regions".

Advantageously, the clustering algorithm is applied to the transformed positions of object surface spots using circular clustering regions. The clustering algorithm itself is thus kept relatively simple.

In accordance with an embodiment of the invention, the positions of object surface spots respectively include a first and a second Cartesian coordinate, wherein the first and the second Cartesian coordinates are scaled differently in the directional scaling step. Such a scaling of positions in a Cartesian space is easy to perform. For example, the first and the second Cartesian coordinates may be multiplied by different factors or divided by different factors.

In particular, in the directional scaling step, the first Cartesian coordinates of the positions of object surface spots may be divided by a scale factor greater than 1. The second Cartesian coordinates can be left unchanged. Thus, the first Cartesian coordinates are moved closer together, resulting in a compression of the space in one direction. If a clustering algorithm that uses circular clustering regions is applied to such transformed positions, the effective clustering regions as seen in the vehicle coordinate system are elliptical.

Preferably, the first Cartesian coordinates correspond to a coordinate axis that extends along a longitudinal axis of the host vehicle or a driving direction of the host vehicle. This is advantageous in that detections of objects extending along the ego path, such as guardrails, are reliably connected.

According to an embodiment of the invention, the vehicle speed of the host vehicle is determined and the scale factor is selected dependent on the determined vehicle speed. Thus, speed-dependent effects can be considered.

Specifically, the scale factor may be defined as a function of the determined vehicle speed, wherein the function of the determined vehicle speed, at least sectionally, increases with increasing vehicle speed. In this way, at high velocities, specifically large gaps between single detections are closed by the clustering process. This enhances the safety, because tight turns at higher speeds are not possible due to the dynamics of the host vehicle.

The function can include a first, constant section and a second, linearly increasing section. Such a functional course has turned out to generate specifically reliable clustering results.

In accordance with another embodiment of the invention, the scale factor is selected dependent on the distance of the respective position from the host vehicle. In this manner, distance-dependent effects can be considered.

In particular, the scale factor may be defined as a function of the distance, wherein the function of the distance, at least sectionally, increases with increasing distance. As mentioned above, gaps between single detections are especially large at high distances. A scale factor which increases with increasing distance can account for this effect.

The function preferably includes a first, linearly decreasing section, a second, constant section and a third, linearly increasing section. The first section can be located behind the host vehicle, wherein the second section overlaps the host vehicle and the third section is located in front of the host vehicle. Such a functional course has turned out to generate specifically reliable clustering results.

According to a further embodiment of the invention, the transformation process includes a straightening step that shifts the positions in a transverse direction with respect to a longitudinal axis of the host vehicle such that curves in a lane of the traffic space are straightened. In case the road in front of the host vehicle is curved, the non-circular clustering regions can't be oriented according to the course of the ego path, since they are all aligned in the same direction. The straightening step eliminates this problem.

The straightening step can be based on a constant radius of curvature. The radius of curvature can be estimated based on an output of the sensor system or a separate sensor. A straightening step using a constant radius of curvature requires only little computing effort and is well suited for slightly curved roads.

Alternatively, the straightening step can be based on a coordinate transformation from a curvilinear coordinate system to a Cartesian coordinate system. Such a straightening step is very exact and works well even if the curvature of the road is pronounced.

The invention also relates to a system for the recognition of objects from a motor vehicle, wherein the system includes a sensor system to be arranged at or in the motor vehicle and an electronic processing device for processing output signals of the sensor system.

According to the invention, the electronic processing device is configured for carrying out a method as disclosed above.

The electronic processing device may comprise a computer.

The invention further relates to a computer program product including executable program code which, when executed, carries out a method as disclosed above.

The disclosure with reference to the inventive method is also true for the inventive system and the inventive computer program product.

Further features and advantages will appear more clearly on a reading of the following detailed description of the preferred embodiment, which is given by way of non-limiting example only and with reference to the accompanying drawings.

BRIEF DESCRIPTION OF DRAWINGS

Subsequently, the present invention is explained in more detail based on an exemplary embodiment with reference to the accompanying figures, wherein.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
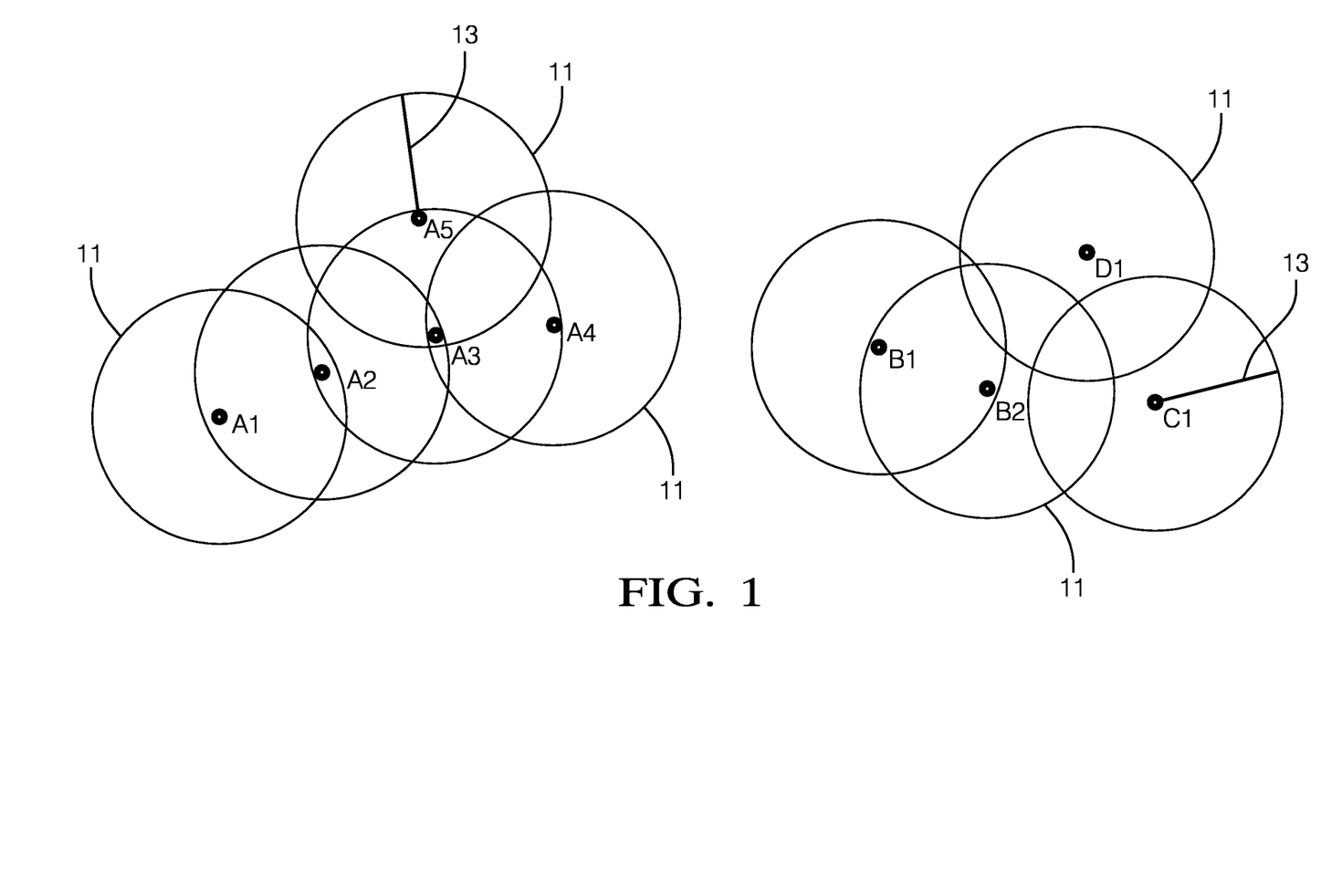
FIG. 1 shows circular clustering regions used by a clustering algorithm.

In FIG. 1, there are shown nine points A1, A2, A3, A4, A5, B1, B2, C1, D1 to be clustered by means of a known hierarchical clustering algorithm. In order to find groups in the set of points, clustering regions 11 defining threshold distances are defined. FIG. 1 shows clustering regions 11 which are circular and have an equal clustering radius 13. During clustering, it is checked if the distance of a certain point is below the threshold distance of an adjacent point. If this is the case, it is determined that the two the points belong to a group. In the example shown in FIG. 1, there are four groups. The points A1-A5 in the left part of FIG. 1 belong to one group. Another group is formed by the points B1 and B2. The points C1 and D1 are not included in any of the mentioned groups, because the distances from the points C1 and D1 to any of the other points is higher than the clustering radius 13.

Figure 2:
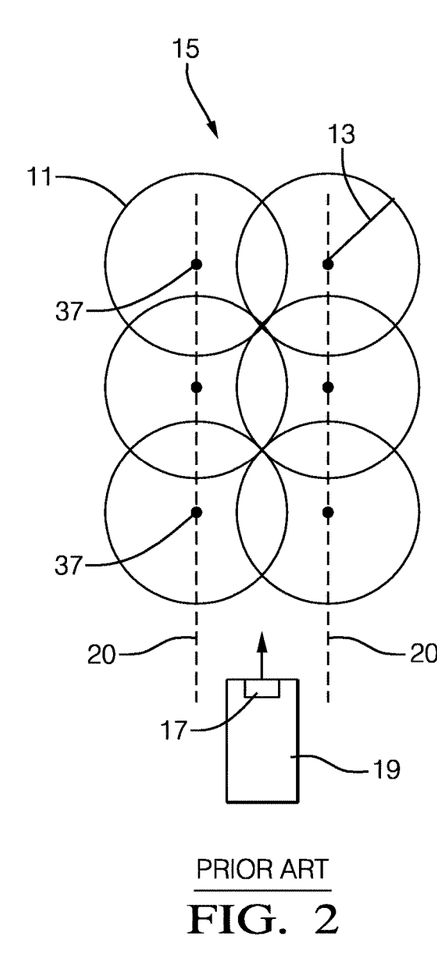
FIG. 2 shows effective clustering regions in a vehicle coordinate system used by a clustering algorithm according to the prior art.
Figure 3:
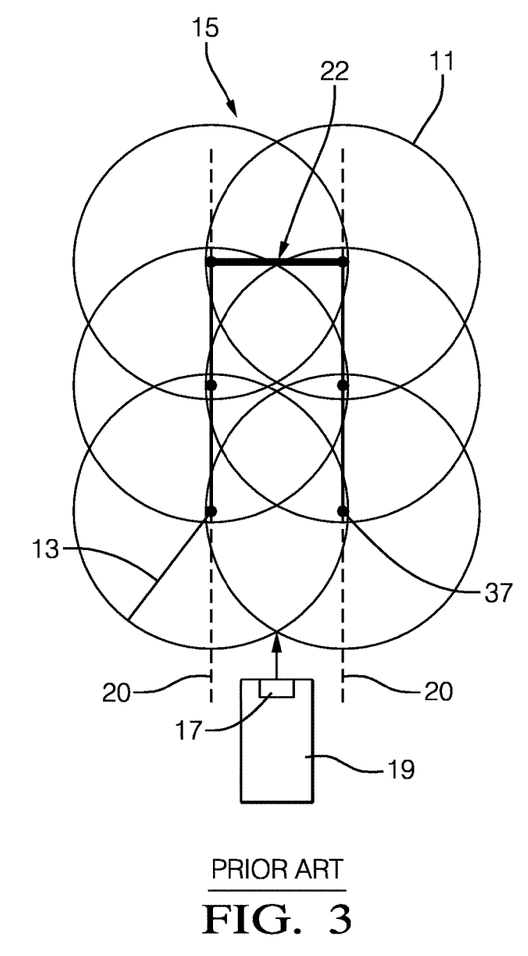
FIG. 3 shows alternative effective clustering regions in a vehicle coordinate system used by a clustering algorithm according to the prior art.
Figure 4:
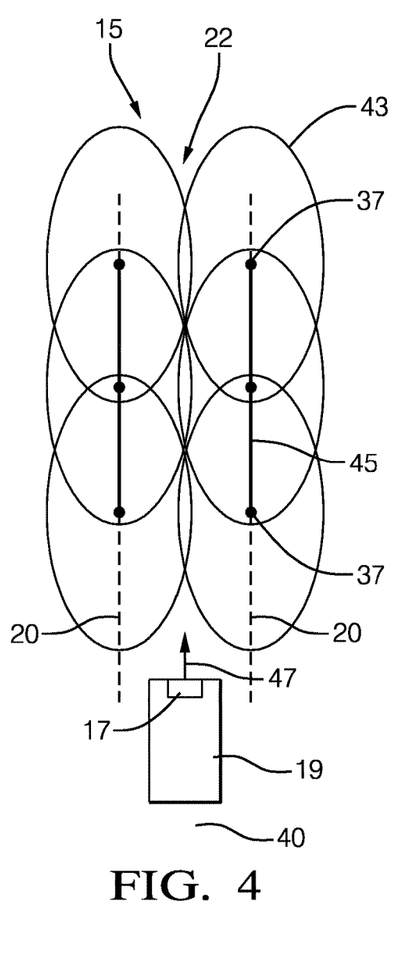
FIG. 4 shows effective clustering regions in a vehicle coordinate system used by a clustering algorithm according to an embodiment of the invention.

As shown in FIGS. 2-4, a hierarchical clustering algorithm can be used to identify objects in a traffic space 15 by means of a sensor system 17 arranged at or in a host vehicle 19. The sensor system 17 outputs a plurality of single detections 37. The single detections 37 may be determined by means of a radar or laser perception system and represent reflections from a certain surface spot of an object such as a guardrail 20. By means of the clustering algorithm, the single detections 37 are assigned to one or more detection groups as described above. It is determined that single detections 37 belonging to the same detection group form part of a single object. In particular during highway driving, the density of single detections 37 can be rather low.

FIG. 2 and FIG. 3 show the results of a clustering algorithm according to the prior art. As can be seen, the clustering regions 11 are circular in real world coordinates. If the clustering radius 13 is too small, single detections 37 of a guardrail 20 are not grouped and therefore not connected. Such a situation is shown in FIG. 2. If the clustering radius 13 is increased to avoid this problem, there is a risk that the gap 22 between the left and the right guardrail 20 is closed. This situation is shown in FIG. 3. With respect to the performance of an advanced driver assistance system (not shown) using the clustering method, the clustering results shown in FIGS. 2 and 3 are both undesired and potentially dangerous.

It is possible to use a weighted clustering, i. e. to apply a weighting factor to each of the clustered detections 37. Such a weighting is equivalent to an individual modification of the clustering radius 13. It is also possible to modify the clustering radius 13 dependent on the speed of the host vehicle 19 in order to close larger gaps for higher speeds. From FIGS. 2 and 3, it is clear that a modification of the clustering radius 13 can't solve the conflict between a reliable connection of single detections 37 belonging to a real object and the avoidance of closing real gaps.

In accordance with the invention, as shown in FIG. 4, non-circular clustering regions 43 are used. Specifically, the clustering regions 43 are elliptical in real world coordinates. To achieve this, the single detections 37 are transformed in a transformation process and the clustering algorithm is applied to the transformed detections. The transformation process includes a directional scaling step that renders the effective clustering regions 43 elongate. The longitudinal axes 45 of the elliptical clustering regions 43 extend along the driving direction 47 as shown. Therefore, the single detections 37 of both guardrails 20 are connected, but the gap 22 between the guardrails 20 is not connected.

Subsequently, the transformation process is described in detail with reference to FIGS. 4-10.

Figure 5:
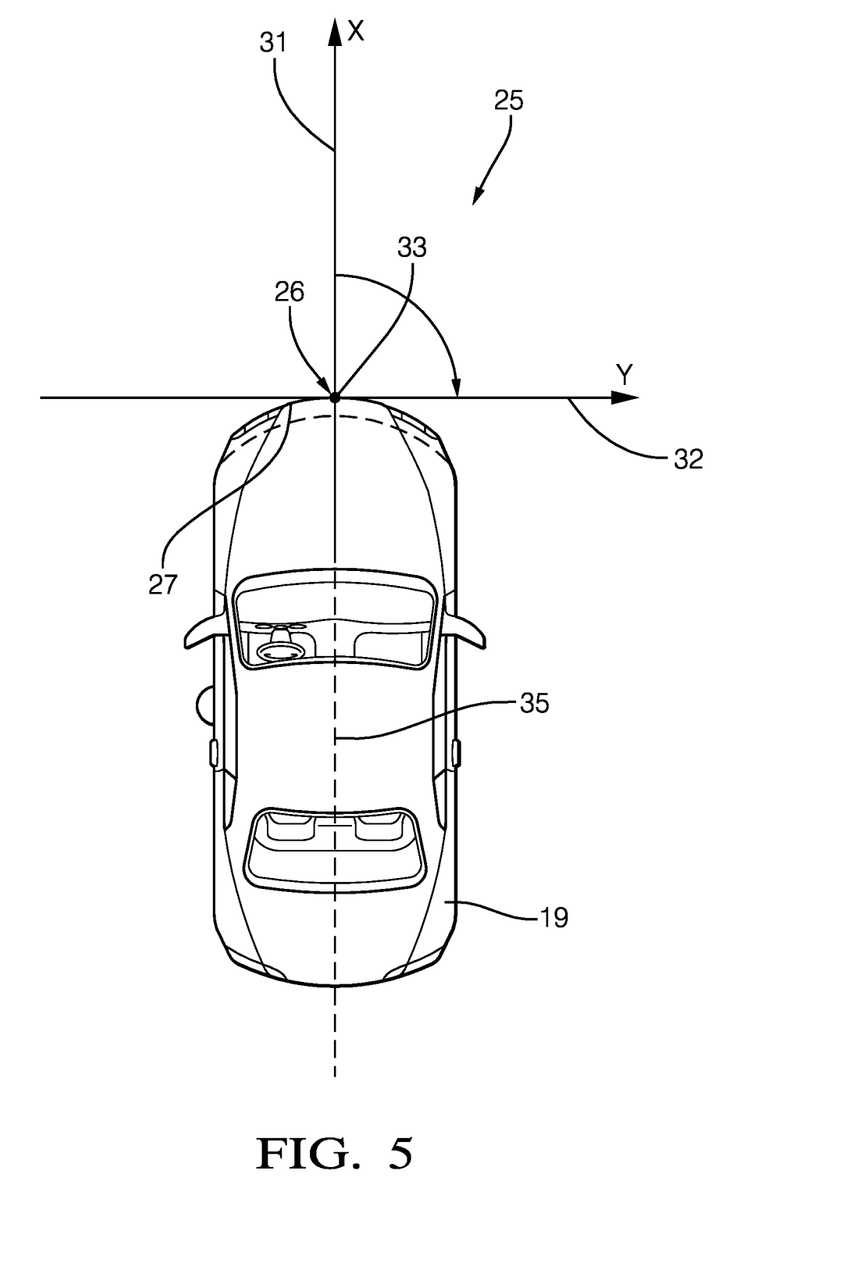
FIG. 5 shows a vehicle coordinate system used by a method for identifying objects in a traffic space according to the invention.

A vehicle coordinate system 25 is defined as shown in FIG. 5. The origin 26 is located at the center of the front bumper 27 of the host vehicle 19. The x-axis 31 is parallel to the longitudinal axis 35 of the host vehicle 19. The vehicle coordinate system 25 is right-handed, i. e. the y-axis 32 is orthogonal to the x-axis 31 and points to the right. The z-axis 33 points into the ground, that is into the page.

The single detections 37, i. e. the positions of object surface spots in the vehicle coordinate system 25, respectively include a first Cartesian coordinate $p_{i,x}$ and a second Cartesian coordinate $p_{i,y}$. In the transformation process, a straightening step that shifts the detections 37 in x-direction is carried out to eliminate curves of the road 40. The straightening step may be based on a constant radius of curvature R of a curve of the road. Specifically, the straightened coordinates are calculated from the input coordinates according to the following formulae:

$$t_{i,y} = \frac{1}{2R}(p_{i,x}^{input})^2$$

$$p_{i,y}^{straight} = p_{i,y}^{input} - t_{i,y}$$

$$p_{i,x}^{straight} = p_{i,x}^{input}$$

Alternatively, the straightening step may be based on a coordinate transformation from a curvilinear coordinate system to a Cartesian coordinate system. In this case, the straightened coordinates are calculated from the input coordinates according to the following formulae:

$$\alpha = \tan^{-1}\left(\frac{p_{i,x}^{input}}{R - p_{i,y}^{input}}\right)$$

$$p_{i,y}^{straight} = R - \frac{p_{i,x}^{input}}{\sin(\alpha)}$$

$$p_{i,x}^{straight} = \alpha R$$

If the road is essentially straight, the straightening step may be omitted:

$$p_{i,x}^{straight} = p_{i,x}^{input}$$

$$p_{i,y}^{straight} = p_{i,y}^{input}$$

The straightened coordinates are subjected to a directional scaling step, wherein the x-coordinates are divided by a scale factor $s_x$ greater than 1 while the y-coordinates are left unchanged. The scale factor $s_x$ may be constant. The transformed x-coordinate, provided with the index "new", is calculated as follows:

$$p_{i,x}^{new} = \frac{p_{i,x}^{straight}}{s_x}$$

In an alternative embodiment of the invention, the vehicle speed v of the host vehicle 19 is determined and the scale factor $s_x$ is selected dependent on the determined vehicle speed v. In particular, the scale factor $s_x$ can be defined as a function of the vehicle speed v according to the following formula:

$$s_x(v) = \begin{cases} 1 & \text{for } |v| \leq v_{TH} \\ 1 + a(|v| - v_{TH}) & \text{for } v > v_{TH} \end{cases}$$

where $v_{th}$ is a threshold speed and a>0.

Figure 6:
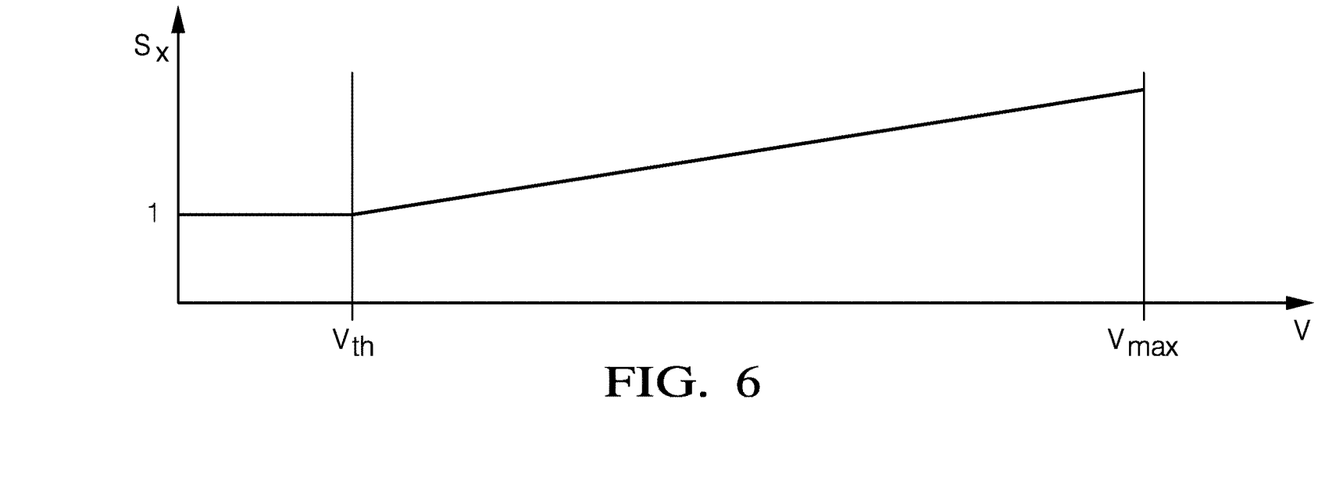
FIG. 6 shows a scale factor used by a method for identifying objects in a traffic space according to the invention as a function of the speed of the host vehicle.

The course of this function is shown in FIG. 6. The corresponding directional scaling step is:

$$p_{i,x}^{new} = \frac{p_{i,x}^{straight}}{s_x(v)}$$

Alternatively to a speed-dependent scale factor $s_x(v)$, a position-dependent scale factor $s_x(p_{i,x})$ may be selected:

$$p_{i,x}^{new} = \frac{p_{i,x}^{straight}}{s_x(p_{i,x}^{straight})}$$

Figure 7:
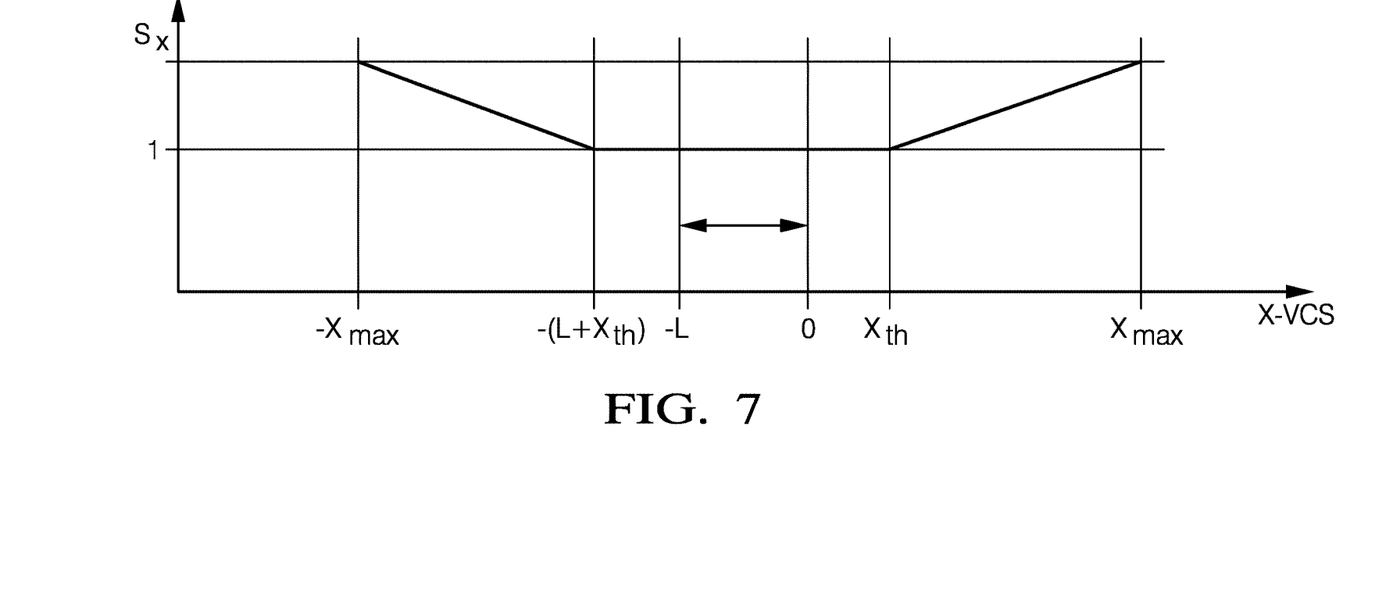
FIG. 7 shows the scale factor as a function of the distance of a considered position from the host vehicle.

Preferably, the scale factor $s_x$ increases with increasing distance from the host vehicle 19. A specifically preferred function is shown in FIG. 7, where L is the length of the host vehicle 19.

According to a further embodiment of the invention, the scale factor $s_x$ is both speed-dependent and position-dependent:

$$p_{i,x}^{new} = \frac{p_{i,x}^{straight}}{s_x(p_{i,x}^{straight}, v)}$$

After the transformation process has been finished, a clustering algorithm using circular clustering regions is applied to the transformed coordinates. Due to the previous directional scaling step, the effective clustering regions 43 are elliptical in the vehicle coordinate system 25. Finally, it is assumed that detections 37 belonging to a group established by the clustering algorithm form part of a single object.

Figure 8:
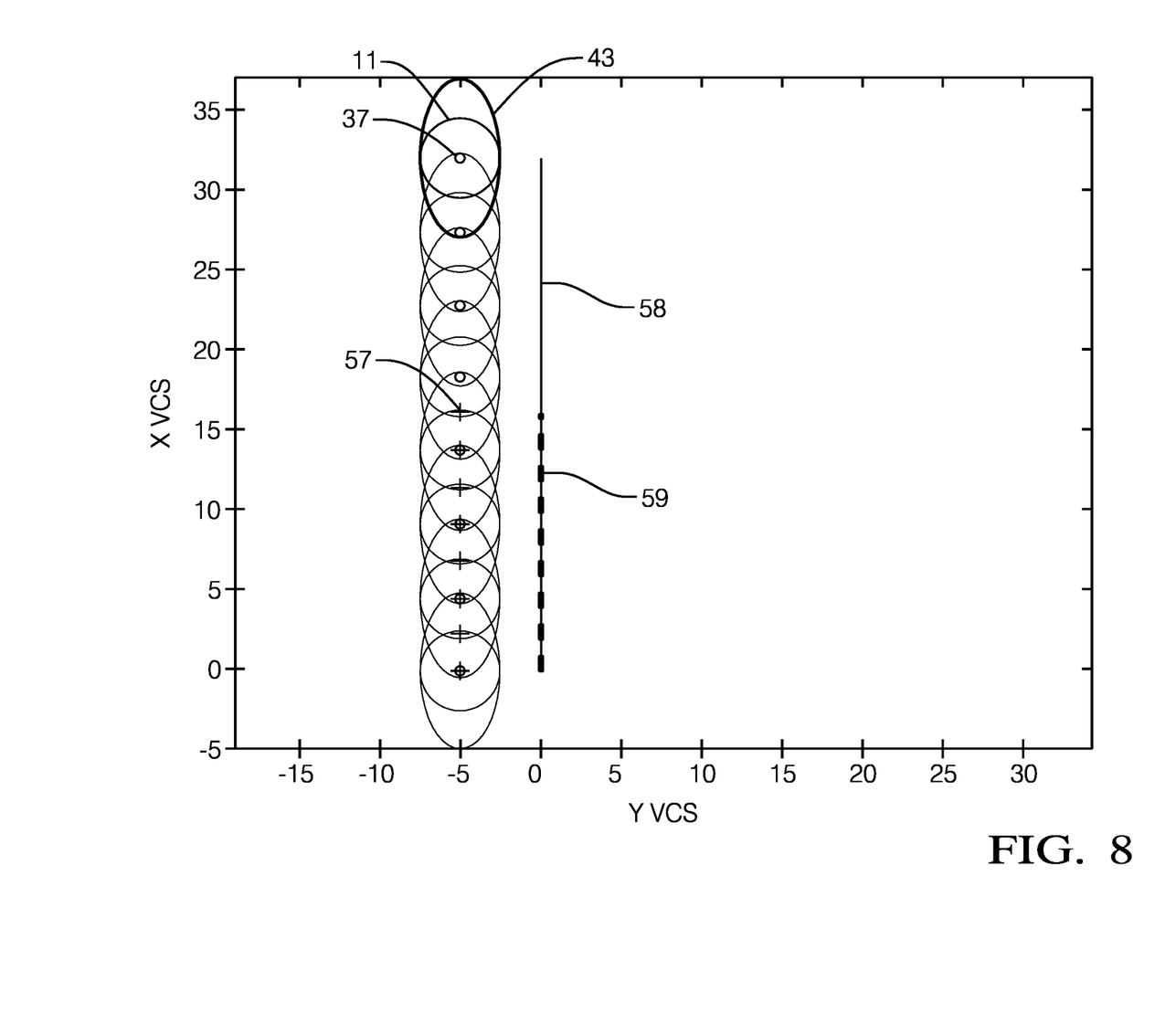
FIG. 8 shows positions of object surface spots and clustering regions before and after a transformation process of a method according to a first embodiment of the invention.
Figure 9:
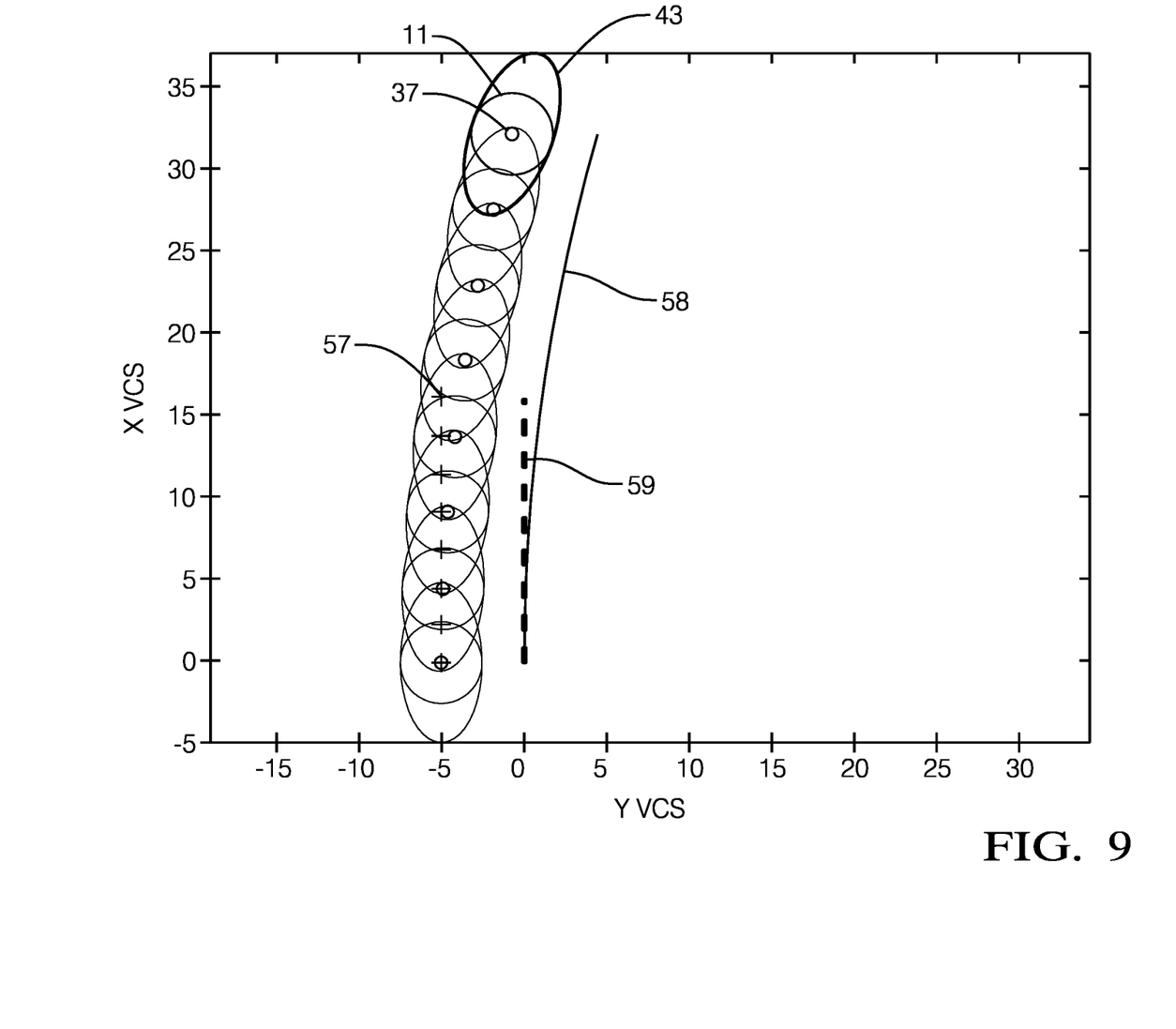
FIG. 9 shows positions of object surface spots and clustering regions before and after a transformation process of a method according to a second embodiment of the invention.
Figure 10:
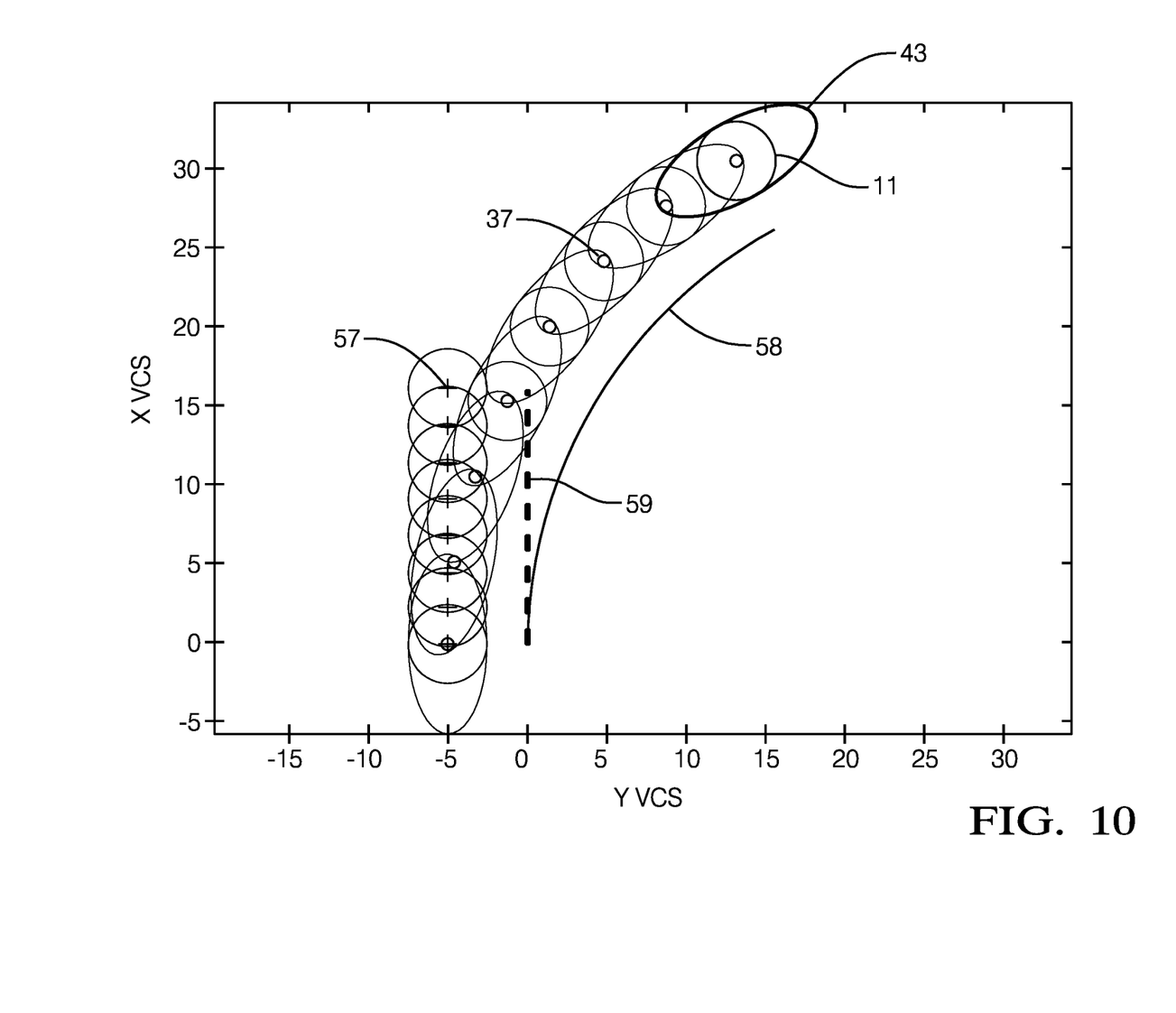
FIG. 10 shows positions of object surface spots and clustering regions before and after a transformation process of a method according to a third embodiment of the invention.

FIG. 8-10 show results of a method according to the invention, wherein the original detections 37 are shown as circles, the transformed detections 57 are shown as crosses, the original ego path 58 is shown as continuous line, the transformed ego path 59 is shown as dashed line, the clustering regions 43 are shown as ellipses and clustering regions 11 of a corresponding method according to the prior art are shown as circles.

FIG. 8 corresponds to an embodiment wherein no straightening is performed, because the original ego path 58 is straight. The transformed detections 57 are closer together than the original detections 37.

FIG. 9 corresponds to an embodiment wherein a straightening based on a constant radius of curvature R of a curve of the road 40 is performed. In this case, the effective clustering regions 43 are skewed ellipses.

FIG. 10 corresponds to an embodiment wherein a straightening based on a coordinate transformation from a curvilinear coordinate system to a Cartesian coordinate system is performed. In this case, the clustering regions 43 are bent ellipses. In all embodiments, all detections 37 of a guardrail 20 alongside the road 40 are assigned to the same group. Thus, the guardrail 20 is correctly handled as a single object. However, the gap 22 between two parallel guardrails 20 is not artificially closed.

The invention enables a correct grouping of single detections 37 located along the ego path 58 of a host vehicle 19 without the risk of creating artificial obstacles by bridging gaps. The available processing power can be used in a flexible manner, dependent on the curvature of the ego path 58. The method can be flexibly adapted to the dynamics of the host vehicle 19.

While this invention has been described in terms of the preferred embodiments thereof, it is not intended to be so limited, but rather only to the extent set forth in the claims that follow.

We claim:

1. A method for identifying objects in a traffic space by means of a sensor system arranged at or in a host vehicle, said method comprising the steps:
   determining the positions of a plurality of object surface spots detected by the sensor system in a vehicle coordinate system;
   assigning the determined positions of object surface spots to at least one detection group by means of a clustering algorithm, wherein the clustering algorithm uses clustering regions defining threshold distances; and
   identifying at least one object by determining that positions of object surface spots belonging to the same detection group form part of a single object,
   wherein the determined positions of object surface spots are transformed in a transformation process and the clustering algorithm is applied to the transformed positions of object surface spots, wherein the transformation process includes a directional scaling step that renders the clustering regions non-circular in the vehicle coordinate system.

2. A method in accordance with claim 1, wherein the directional scaling step renders the clustering regions elliptical in the vehicle coordinate system, wherein longitudinal axes of the elliptical clustering regions respectively extend along a longitudinal axis of the host vehicle or along an assumed driving direction of the host vehicle.

3. A method in accordance with claim 1, wherein the clustering algorithm is applied to the transformed positions of object surface spots using circular clustering regions.

4. A method in accordance with claim 1, wherein the positions of object surface spots respectively include a first and a second Cartesian coordinate, wherein the first and the second Cartesian coordinates are scaled differently in the directional scaling step.

5. A method in accordance with claim 4, wherein in the directional scaling step, the first Cartesian coordinates of the positions of object surface spots are divided by a scale factor greater than 1.

6. A method in accordance with claim 5, wherein the first Cartesian coordinates correspond to a coordinate axis that extends along a longitudinal axis of the host vehicle or a driving direction of the host vehicle.

7. A method in accordance with claim 5, wherein the vehicle speed of the host vehicle is determined and the scale factor is selected dependent on the determined vehicle speed.

8. A method in accordance with claim 7, wherein the scale factor is defined as a function of the determined vehicle speed, wherein the function of the determined vehicle speed, at least sectionally, increases with increasing vehicle speed.

9. A method in accordance with any one of claim 5, wherein
   the scale factor is selected dependent on the distance of the respective position from the host vehicle.

10. A method in accordance with claim 9, wherein the scale factor is defined as a function of the distance, wherein the function of the distance, at least sectionally, increases with increasing distance.

11. A method in accordance with claim 1, wherein the transformation process includes a straightening step that shifts the positions in a transverse direction with respect to a longitudinal axis of the host vehicle such that curves in a lane of the traffic space are straightened.

12. A method in accordance with claim 11, wherein the straightening step is based on a constant radius of curvature.

13. A method in accordance with claim 11, wherein the straightening step is based on a coordinate transformation from a curvi-linear coordinate system to a Cartesian coordinate system.

14. A system for the recognition of objects from a motor vehicle, wherein
   the system includes a sensor system to be arranged at or in the motor vehicle and an electronic processing device for processing output signals of the sensor system, and
   the electronic processing device is configured for carrying out a method in accordance with claim 1.

15. A non-transitory computer program product including executable program code which, when executed, carries out a method in accordance with claim 2.

* * * * *